No. 721,306. PATENTED FEB. 24, 1903.
J. H. HUTCHERSON.
PLANTING ATTACHMENT FOR CULTIVATORS.
APPLICATION FILED OCT. 6, 1902.
NO MODEL. 3 SHEETS—SHEET 1.
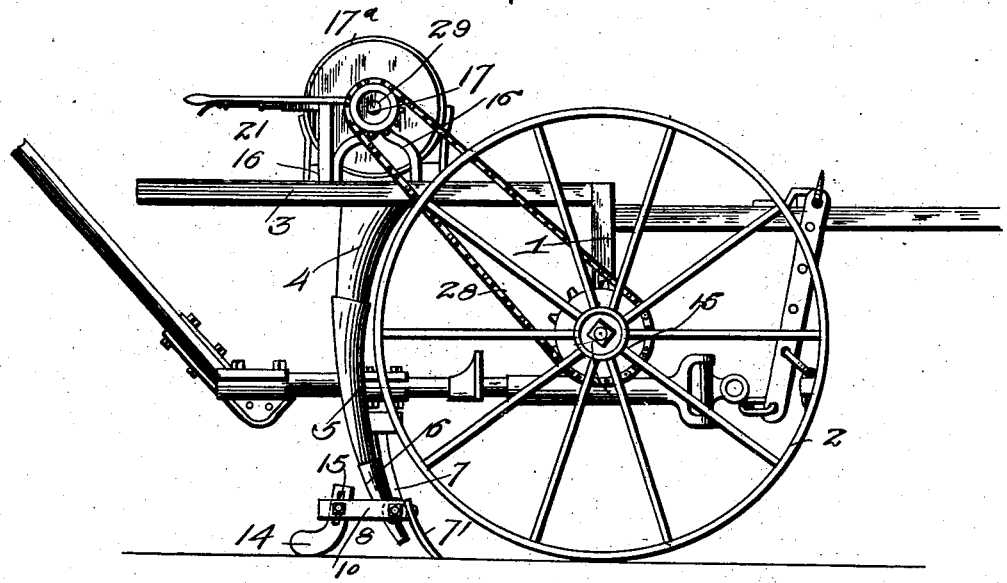
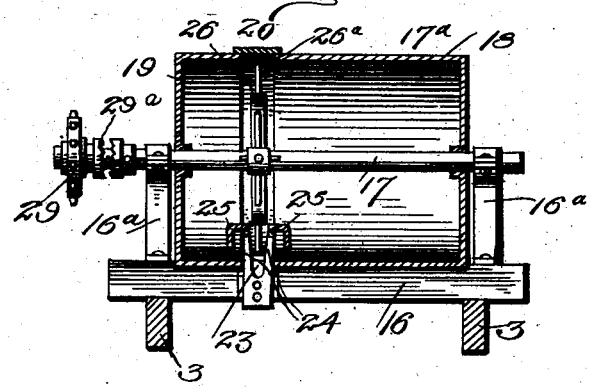
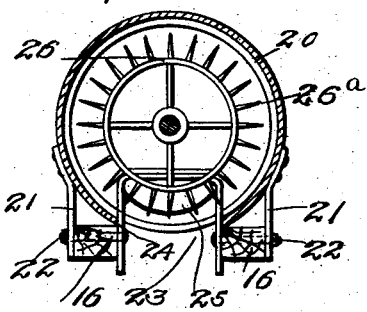
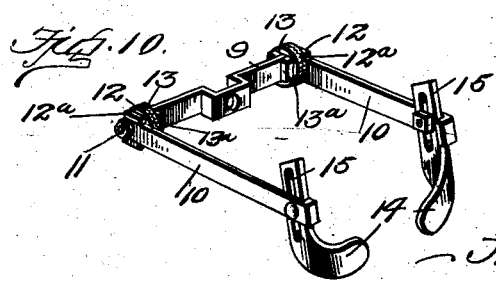
Inventor
J. H. Hutcherson
Witnesses
By H. B. Willson & Co.
Attorneys No. 721,306. PATENTED FEB. 24, 1903.
J. H. HUTCHERSON.
PLANTING ATTACHMENT FOR CULTIVATORS.
APPLICATION FILED OCT. 6, 1902.
NO MODEL. 3 SHEETS—SHEET 2.
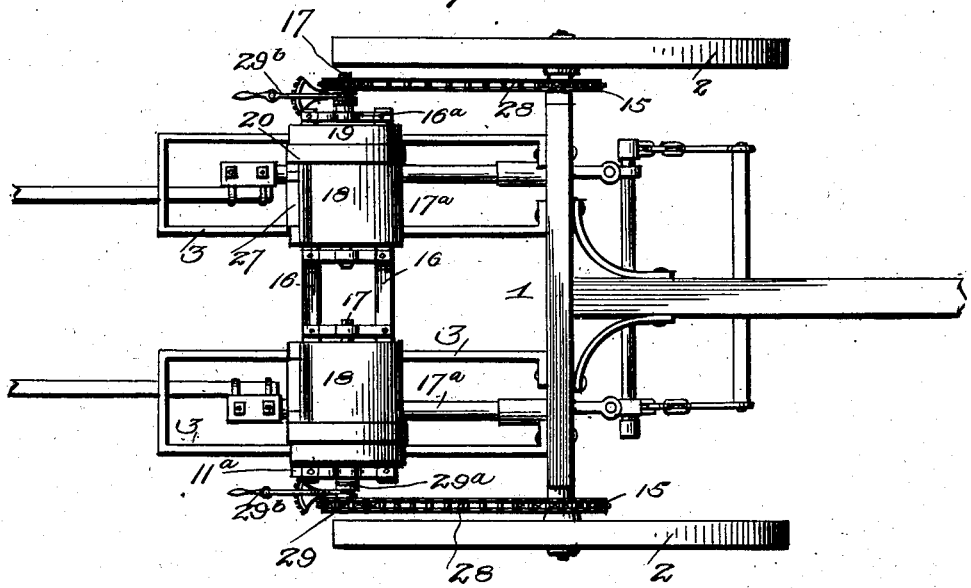
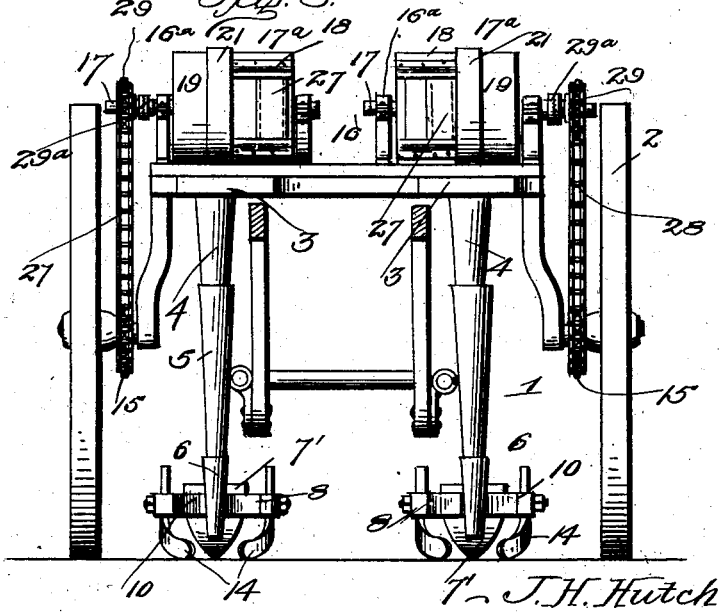
Inventor
J. H. Hutcherson
Witnesses
By
Attorneys

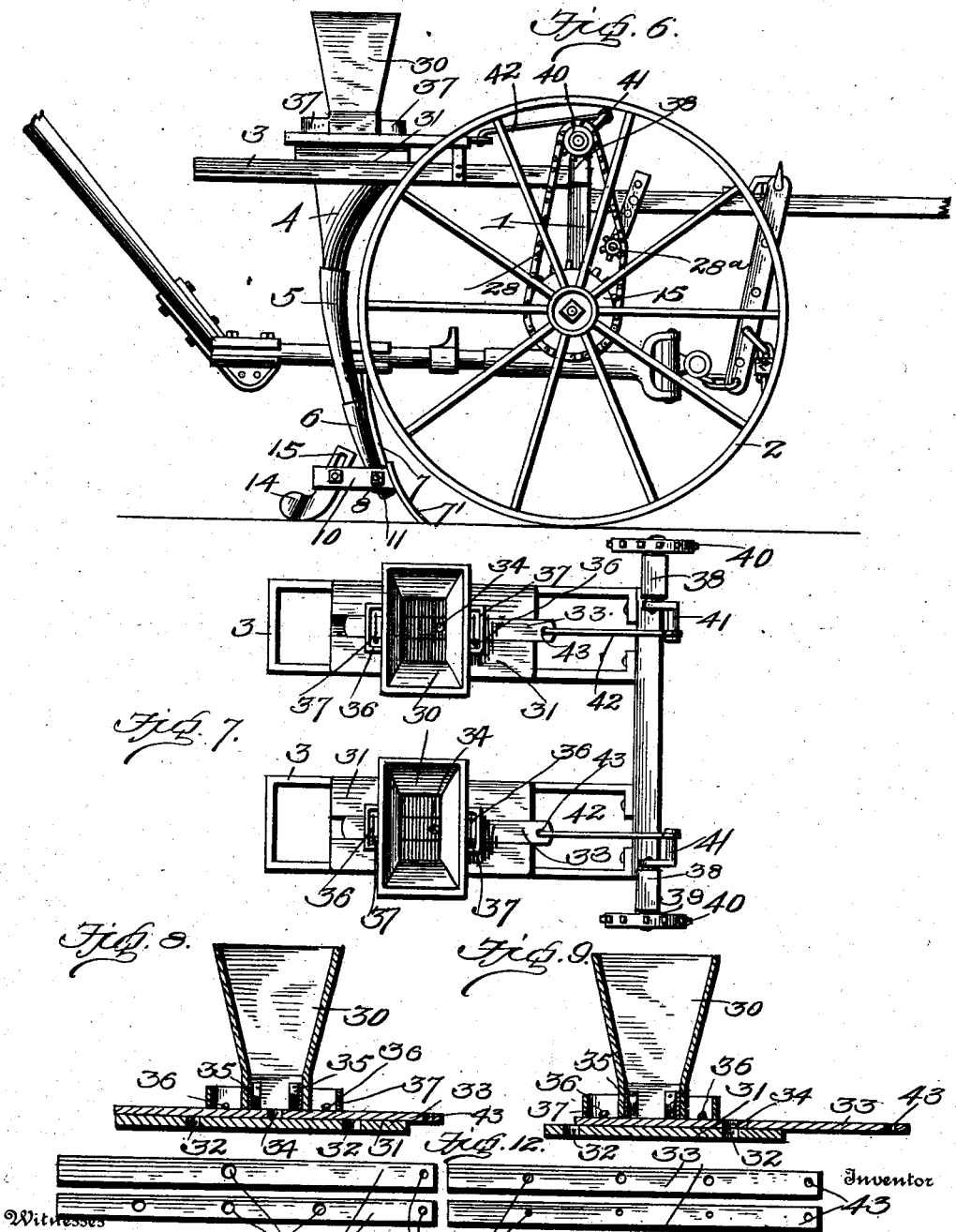

UNITED STATES PATENT OFFICE.

JAMES H. HUTCHERSON, OF BROWNWOOD, TEXAS.

PLANTING ATTACHMENT FOR CULTIVATORS.

SPECIFICATION forming part of Letters Patent No. 721,306, dated February 24, 1903.

Application filed October 6, 1902. Serial No. 126,173. (No model.)

*To all whom it may concern:*

Be it known that I, JAMES H. HUTCHERSON, a citizen of the United States, residing at Brownwood, in the county of Brown and State of Texas, have invented certain new and useful Improvements in Planting Attachments for Cultivators; and I do declare the following to be a full, clear, and exact description of the invention, such as will enable others skilled in the art to which it appertains to make and use the same.

This invention relates to attachments for cultivators to adapt the same for planting grain, cotton, or other seeds, the object being to provide interchangeable attachments of this character which may be readily applied and removed from the cultivator.

A further object is to provide attachments of this character which shall be simple in construction, durable in use, efficient and easy of operation, and which may be applied to most wheeled cultivators now in use, in single or double form, or which may be applied to walking-cultivators with but slight variation of the attaching and operating means.

With these and other objects in view the invention consists in the combination and arrangement of the parts, as will be hereinafter described, reference being had to the accompanying drawings, in which—

Figure 1 is a side view of a cultivator, showing the application of the cotton-planting attachment thereto. Fig. 2 is a top plan view thereof. Fig. 3 is a rear elevation of the same.
Fig. 4 is an enlarged transverse vertical section through one of the cotton-hoppers. Fig. 5 is a vertical longitudinal section through the same. Fig. 6 is a view similar to Fig. 1, showing the application of the grain-planting attachment. Fig. 7 is a top plan view of the attachment. Figs. 8 and 9 are longitudinal vertical sections through one of the grain-hoppers, showing different positions of the feed-slide. Fig. 10 is a detail view of the drag or covering attachment. Fig. 11 is a detail view of one of the covering-disks to be used in place of the covering-blades, and Fig. 12 is a detail view of several forms of feed-slides.

Referring now more particularly to the drawings, the numeral 1 represents the frame of a cultivator of ordinary construction, the same being mounted upon the carrying-wheels 2, and 3 represents auxiliary frames bolted or otherwise secured to the rear portion of the frame 1 and designed in accordance with my invention to support the planting attachments. Connected to the frame 3 are the conducting-tubes 4, into which the seed or grain discharges from the hoppers, said tubes being connected, by means of flexible tubes 5, with tubular discharge-spouts 6, fixed to the standards 7 of the cultivator plows or shovels 7', whereby seed or grain is dropped in rear of said plows or shovels and in the drill or furrow formed thereby. To the rear side of each standard 7 is attached the supports for the covering devices, the same consisting of a U-shaped bracket 8, comprising a cross-bar 9 and side bars 10.
The ends of the cross-bar 9 are reduced and threaded, and the adjacent ends of the side bars 10 are perforated and adapted to engage the reduced ends of the cross-bar 9 and to be held thereon by nuts 11, screwed onto the said ends of the bar 9. Between the abutting ends or shoulders on the ends of bar 9, and the adjacent face of the bars 10 are interposed washers 12 and 13, the engaging faces of which are roughened or corrugated, while the opposite faces or backs of the washers have formed thereon lugs or shoulders $12^a$ and $13^a$, which are adapted to embrace the contiguous portions of the bars 9 and 10, so that said washers are locked to the bars 9 and 10, respectively, the object of this construction being to enable the bars 10 to be swung or raised up or down with respect to the bar 9 to adjust the covering means carried at the ends of said bars, the said covering means consisting of curved blades 14, having slotted shanks 15, which have adjustable connection with the outer ends of the bars 10 by means of a bolt passing through said slot and through the said ends of bars 10 and receiving a nut, which when screwed up tightly clamps the said shank and blade to the said bars.

In lieu of the blades 14 I may, if desired, substitute therefor covering disks or wheels, as shown in Fig. 11. To impart motion to the seed-dropping mechanism, hereinafter described, I fix upon the hubs of the carrying-wheels 2 sprocket-wheels 15.

The auxiliary frame 3 is adapted to support interchangeable attachments for the dropping and planting of seed and grain or cotton or two or more kinds of seed or grain simultaneously. The cotton-planting attachment consists of supporting-frames comprising spaced bars 16, adapted to be clamped to the side bars of the auxiliary frames 3 and provided at their opposite ends with bearings 16ª for the hopper-shafts 17. A hopper-cylinder 17ª is mounted upon each of said shafts, and each consists of two spaced sections 18 and 19, placed with their open ends facing each other and spaced just far enough apart to form a slot for the outlet of the cotton-seed. This space is closed, except at the bottom, by a nearly-circular band or strip 20, having short straps 21, connected to the bars 16 by bolts 22. The ends of this band terminate approximately in line with the inner faces of the bars 16, leaving the space between them open to form the feed-slot 23. Projecting up into this slot are a pair of inverted substantially U-shaped brackets 24, the downwardly-projecting arms of which are adjustably connected to the bars 16 by the bolts 22, so that said brackets may be raised or lowered. These brackets carry angular feed-plates 25, between which the cotton-seed is fed downward into the slot and which may be raised or lowered to regulate the amount of seed allowed to discharge by adjusting said brackets 24. An agitator or stirrer wheel 26 is fixed to the hopper-shafts 17 within each hopper-cylinder 17ª and is adapted to turn with the said shaft and cylinder. The wheel 26 consists of a central hub having spokes radiating therefrom and supporting a band or rim, in which are fixed radially-projecting pins 26ª, which are adapted when said wheel is turned to pass between the feed-plates 25 to stir up and force out the seed and prevent clogging of the feed slot or passage. The section 18 of each hopper is provided with a sliding door 27, whereby access may be obtained thereto for the insertion and removal of the cotton-seed. The shafts 17 of the hopper-cylinders are revolved through the instrumentality of sprocket-chains 28, passing around the sprocket-wheels 15 on the hub of the carrying-wheels 2 and around sprocket-pinions 29 on said shafts 17. The sprocket-pinions 29 are loosely mounted upon the shafts 17 and are provided on the inner faces of their hubs with one member of clutches 29ª, the other members of said clutches being fixed to the shafts 17, a suitably-mounted operating-lever 29ᵇ being employed to throw the pinions 29 and their clutch members into engagement with the clutch members fixed on the shafts 17, whereby said shafts are independently thrown into and out of gear, and by which means one or both hoppers may be rotated to plant seed or held at rest. A chain-tightener 28ª is applied to the chain 28 to take up undue slack.

When it is desired to plant grain or other kinds of seed than cotton-seed, the cotton-planting attachment just described is removed and the grain and seed planting attachment substituted in lieu thereof. The grain and seed planting attachment comprises a pair of hoppers 30, mounted upon supporting-plates 31, adapted to be removably secured by clips or other suitable detachable fastening devices to the side bars of the auxiliary frames 3. These hoppers are open at top and bottom, and each supporting-plate is provided with two feed openings or passages 32, controlled by a slide 33, having a feed opening or openings 34, adapted to be brought into alinement with the openings 32 upon the slide being reciprocated. The slides 33 reciprocate in suitable grooves or guideways formed in the plates 31 and are located immediately beneath the hoppers 30. The feed-openings 32 in the plates 31 are located in alinement and at the same distance apart. The feed-slide 33, as shown in the figures of the drawings, is represented as having but one large feed-opening 34; but it is obvious that I may employ slides having two or more feed-openings and also that said openings may differ in size or shape to adapt the planter to different forms of grain and seed. For instance, a different form of slide would be used when planting peas than would be used when planting corn, and a slide having a greater number of openings would feed faster than a slide having a less number. Therefore it is desirable to have a variety of slides to serve all conditions. By closing up the feed-openings 32 in the supporting-plate on either side of the planter that side will cease to drop seed and the opposite side only will plant, and vice versa. The excess amount of seed contained in the pockets formed by the openings 34 is removed by brushes 35, mounted upon the interior of the hopper. 36 represents springs mounted upon the base-plates 31 to sweep off any excess seed not removed by the brushes 35, thus providing a double cut-off, and these springs are protected by housings 37.

The means for reciprocating the slides 33 is as follows: Mounted upon the side bars of the cultivator-frame 1 above the carrying-wheels 2 are frames or brackets 38, in which are journaled short shafts 39, having mounted on their outer ends sprocket-pinions 40, which correspond to the sprocket-pinions 29 of the cotton-planting attachment and are in like manner connected to sprocket-wheels 15 on the hubs of carrying-wheels 2 and driven by sprocket-chains 28. On the opposite ends of the short shafts 39 are formed cranks 41, to which are connected one end of pitman-rods 42, the opposite ends of which are bent downwardly and adapted to engage openings 43, formed in the forward ends of the slides 33. Thus it will be seen that as the cultivator moves forward motion will be imparted to the sprocket-wheels 29 or 40, as the case may be, by means of the chain 28 to operate the cotton-planting cylinders or to operate the pitman-rods 42, which in turn reciprocate the feed-slides of the grain-hoppers.

While I have shown and described the attachment in connection with double wheeled cultivators, it is obvious that I may attach the same to single forms of wheeled cultivators or to walking-cultivators by employment of but minor changes to the attaching and driving mechanism. Furthermore, I may by means herein described throw either one or the other or both sides of the feeding mechanism into or out of gear.

From the foregoing description, taken in connection with the accompanying drawings, the construction and operation of the attachment will be readily understood without requiring further explanation.

Various changes in the form, proportion, and the minor details of construction may be resorted to without departing from the principle or sacrificing any of the advantages of this invention.

Having thus described my invention, what I claim, and desire to secure by Letters Patent, is—

1. In a planting attachment for cultivators, the combination with a cultivator-frame and its plows carrying discharge-spouts, and sprocket-wheels upon the hubs of the supporting-wheels thereof, of auxiliary frames removably attached to the frame of the cultivator, covering devices attached to the standards of said plows, conducting-tubes leading from the auxiliary frames to said discharge-spouts, seed-dropping mechanism mounted upon said auxiliary frames, and including shafts carrying sprocket-wheels and chains connecting between said sprocket-pinions and the sprocket-wheels carried by the supporting-wheels, substantially as described.

2. In a planting attachment for cultivators, the combination with a cultivator-frame and its plows carrying discharge-spouts, and sprocket-wheels upon the hubs of the supporting-wheels thereof, of auxiliary frames removably attached to the frame of the cultivator, covering devices attached to the standards of said plows, conducting-tubes leading from the auxiliary frames to said discharge-spouts, seed-dropping mechanisms, comprising shafts journaled in bearings mounted on supporting-frames detachably connected to said auxiliary frames, rotating cylindrical hoppers fixed to said shafts, agitator-wheels carried by said shafts within said hoppers, a feed-slot formed between the sections of said hoppers, a band partially closing said slot, a feed-opening formed between the ends of said band and the adjacent edges of said hopper-sections, adjustable feed-plates arranged within said feed-opening to regulate the amount of seed passing through said opening, sprocket-pinions loosely mounted on said shafts, sprocket-chains connecting said pinions with the sprocket-wheels fixed to the said carrying-wheels, and means for connecting the said pinions with the said shaft to rotate the same, substantially as described.

3. In a planter, the combination of a hopper having a transverse slot in its lower side, an inverted-U-shaped bracket in said opening, projecting into said hopper and having a feed-slot and depending feed-plates, the latter on its sides and extending transversely of the hopper, and a revoluble stirring element disposed to operate in the feed-slot of said bracket, substantially as described.

4. The combination, in a planter, of a hopper having an opening in the lower side thereof, a vertically-adjustable bracket extending through said opening and projecting into the hopper and having a slot in its upper side and depending feed-plates, the latter disposed above and on opposite sides of the opening in the bottom of the hopper, and a revoluble agitating element disposed to operate in the slot of said bracket, substantially as described.

In testimony whereof I have hereunto set my hand in presence of two subscribing witnesses.

JAMES H. HUTCHERSON.

Witnesses:
RAYMOND LINDLEY,
EARL BELL.